(12) United States Patent
Ghirardelli et al.

(10) Patent No.: US 11,167,373 B2
(45) Date of Patent: Nov. 9, 2021

(54) PROCESS FOR THE PRODUCTION OF A COMPOSITE ARTICLE

(71) Applicant: FRENI BREMBO S.P.A., Bergamo (IT)

(72) Inventors: Enrico Ghirardelli, Curno (IT); Salvatore Giammarinaro, Curno (IT); Marta Rebussi, Curno (IT); Carlo Bonetti, Curno (IT)

(73) Assignee: Freni Brembo S.p.A., Bergamo (IT)

( * ) Notice: Subject to any disclaimer, the term of this patent is extended or adjusted under 35 U.S.C. 154(b) by 615 days.

(21) Appl. No.: 15/777,300

(22) PCT Filed: Nov. 18, 2016

(86) PCT No.: PCT/IB2016/056953
§ 371 (c)(1),
(2) Date: May 18, 2018

(87) PCT Pub. No.: WO2017/085675
PCT Pub. Date: May 26, 2017

(65) Prior Publication Data
US 2018/0345408 A1    Dec. 6, 2018

(30) Foreign Application Priority Data
Nov. 19, 2015  (IT) .................. 102015000074527

(51) Int. Cl.
*B23K 26/323*    (2014.01)
*B23K 26/28*     (2014.01)
(Continued)

(52) U.S. Cl.
CPC .......... *B23K 26/323* (2015.10); *B23K 26/242* (2015.10); *B23K 26/28* (2013.01);
(Continued)

(58) Field of Classification Search
CPC .... B23K 26/323; B23K 26/242; B23K 26/28; B23K 2103/18; B23K 2103/04; B23K 2103/06
(Continued)

(56) References Cited

U.S. PATENT DOCUMENTS 6,589,671 B1 * 7/2003 Kehrer ............... B23K 15/0073
428/683
2013/0098878 A1 * 4/2013 Briand ................ B23K 26/348
219/74

FOREIGN PATENT DOCUMENTS

DE    102009055876 A1     6/2011
DE    102011077562 A1 * 12/2012 ........... B23K 26/323
(Continued)

OTHER PUBLICATIONS

China National Intellectual Property Administration, Third Office Action in application No. CN2016800678163, dated Aug. 17, 2020, 12 pages, Beijing, China.
(Continued)

*Primary Examiner* — Phuong T Nguyen
(74) *Attorney, Agent, or Firm* — Marshall & Melhorn, LLC

(57) ABSTRACT

A composite article and process for producing the composite article may include the following steps: i) coupling with interference a first component at least partially made of cast iron and a second component at least partially made of steel; ii) arranging one or more wires of filler material at one or more separation zones between said first and second component; iii) in an inert atmosphere, directing a laser beam mostly or exclusively on the steel of the second component and on the filler material for occupying at least part of the separation zone at least with said molten steel and filler material; iv) solidifying by cooling at least the molten steel
(Continued)

and filler material in welding zones to join said first and second component, and thus obtaining the article.

14 Claims, 6 Drawing Sheets

(51) Int. Cl.
*B23K 26/242* (2014.01)
*B23K 103/04* (2006.01)
*B23K 103/06* (2006.01)
*B23K 103/18* (2006.01)

(52) U.S. Cl.
CPC ...... *B23K 2103/04* (2018.08); *B23K 2103/06* (2018.08); *B23K 2103/18* (2018.08)

(58) Field of Classification Search
USPC .............. 219/121.11, 121.13, 121.14, 121.6, 219/121.63, 121.64, 121.65
See application file for complete search history.

(56) References Cited

FOREIGN PATENT DOCUMENTS

| | | |
|---|---|---|
| DE | 102011077562 A1 | 12/2012 |
| FR | 2889471 A1 | 2/2007 |
| GN | 103826793 A | 5/2014 |
| WO | 99/58287 A1 | 11/1999 |

OTHER PUBLICATIONS

European Patent Office, International Search Report and Written Opinion issued in PCT/IB2016/056953, dated Feb. 27, 2017, 9 pages, European Patent Office, Rijswijk, Netherlands.

\* cited by examiner

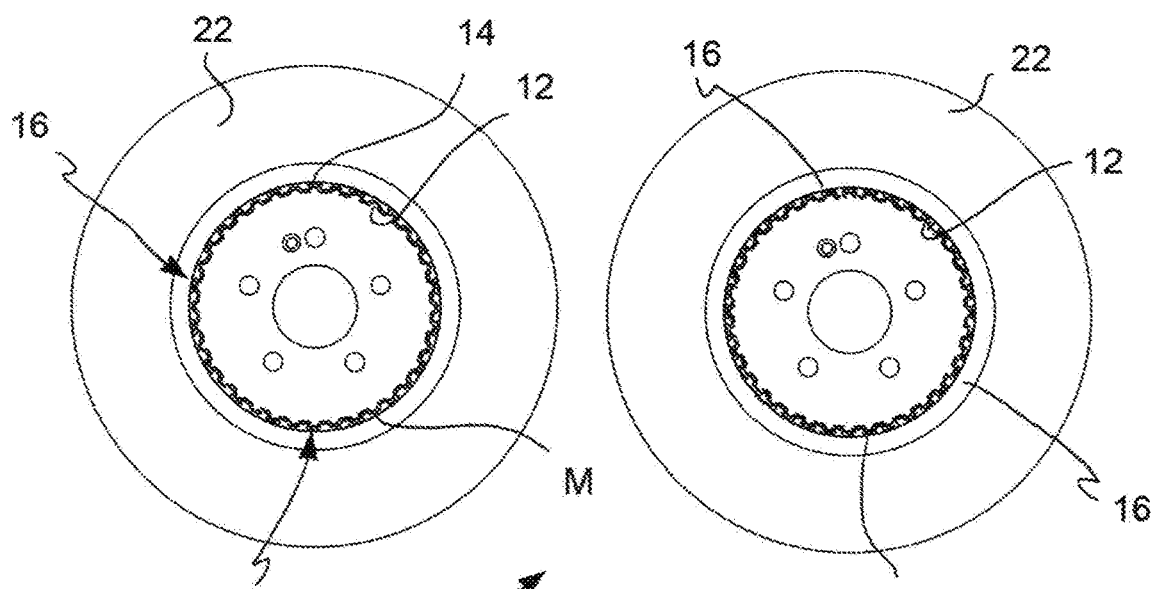
FIG. 10 FIG. 11 FIG. 12
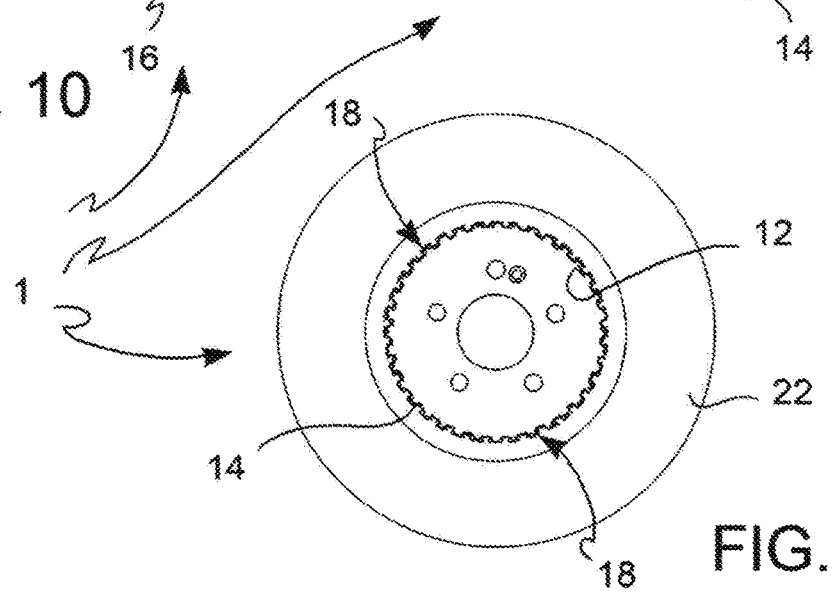
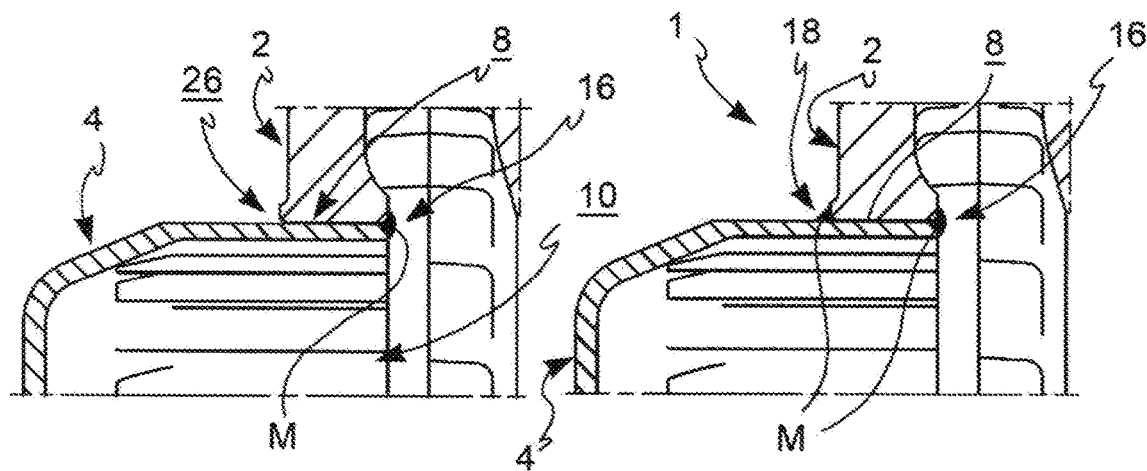
FIG. 13 FIG. 14

PROCESS FOR THE PRODUCTION OF A COMPOSITE ARTICLE

FIELD OF THE INVENTION

This invention relates to a composite material and a process for the production of a composite material, for example a disc for a brake disc.

BACKGROUND OF THE INVENTION

The process of welding steel and cast iron is technologically difficult, and for this reason little used.

The main problems arise from the intrinsic brittleness of cast iron, and the effects that the necessary thermal welding cycles cause on the metallurgical structure of the latter.

As evidenced for example by document DE102009055876, with laser welding it is possible to provide a localised transfer of heat. However, the solution discussed in this document proves unsatisfactory primarily due to the need to heat both the metal surfaces to be joined, but also by virtue of the relative movement between the surfaces of the two partially fused pieces, which could cause incorrect combinations in the final product and an excessive heat input on the cast iron component.

SUMMARY OF THE INVENTION

The present invention relates to the preceding context, proposing to provide a composite article and a process capable of ensuring a reliable union between components in cast iron and steel, designed in order to markedly limit the local heating of the cast iron.

This purpose is achieved by means of a composite article at least partly made of metal, including a first component at least partially made of cast iron and a second component at least partially made of steel coupled with interference; one or more wires of filler material arranged at one or more separation zones between said first and second component; wherein at least part of the separation zone is occupied by the steel of the second component and by the filler material solidified in welding zones to join said first and second component. This purpose is achieved also and by means of a process for producing a composite article at least partially made of metal, such as a disc for disc brake, comprising the following steps from i) to iv). The dependent claims show preferred embodiments.

BRIEF DESCRIPTION OF THE DRAWINGS

The object of this invention will now be described in detail, with the help of the accompanying drawings, in which:

FIGS. 9, 10, 11 and 12 are front views of the welded components, at the end of step iv), according to different embodiments, respectively, with three, eighteen, thirty-six and seventy-two welding zones (of which only thirty-six are visible from the plan view, the other thirty-six being arranged on the other side hidden from view), where FIG. 12 is a plan view from an opposite (or outer) side with respect to the (inner) views of the other figures;

FIGS. 13 and 14 show sections through the composite article at the height of a union point, where such variants differ in the execution of the points on one side only, or on two opposite sides;

DETAILED DESCRIPTION OF THE INVENTION

Figure 1:
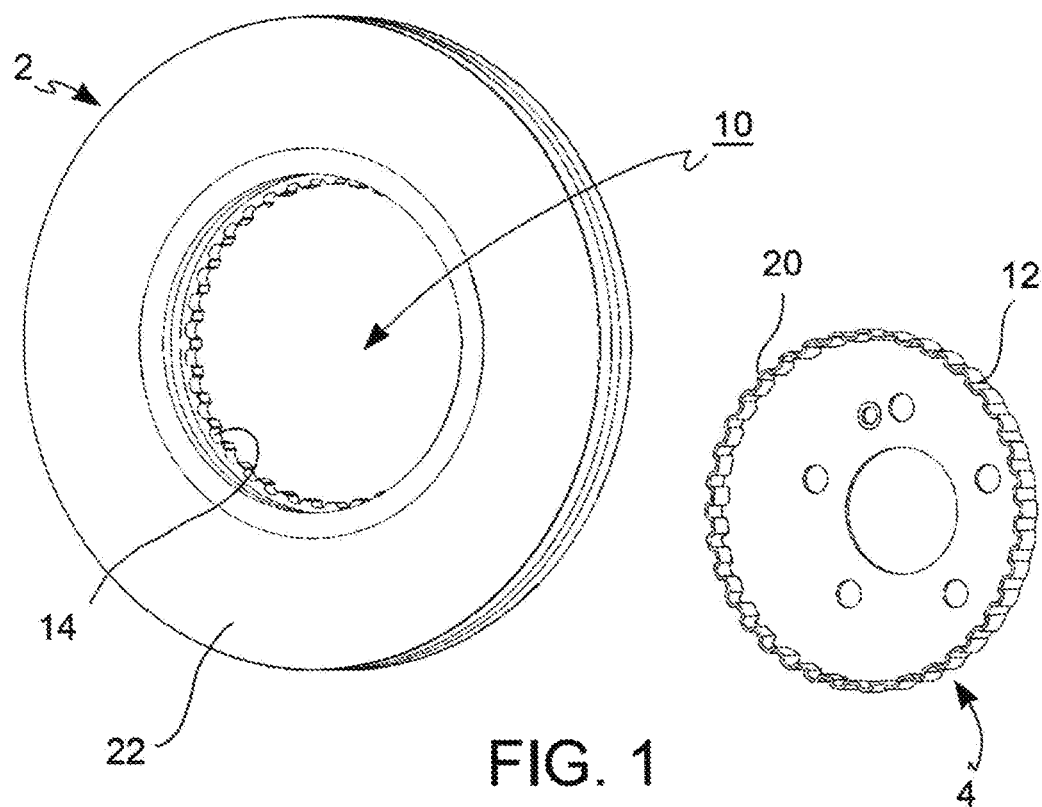
FIG. 1 is a perspective view in separate parts of a first and second component according to this invention, according to a possible embodiment.

The above objective is achieved through a process for the production of a composite article 1 at least partially made of metal, comprising the following steps:

i) coupling with interference a first component 2 at least partially made of cast iron and a second component 4 at least partially made of steel;

ii) arranging one or more wires 6 of filler material M at one or more separation zones 8 between the aforesaid first 2 and second 4 component;

iii) in an inert atmosphere, directing a laser beam L mostly or exclusively on the steel of the second component 4 and on the filler material M for occupying at least part of the separation zone 8 at least with said molten steel and filler material, and optionally with a fraction—advantageously small—of molten cast iron of the first component 2;

iv) solidifying by cooling at least the molten steel and filler material M (and optionally also the fraction of cast iron of the first component 2, possibly molten) in welding zones 16,18 to join the first 2 and second 4 component, and thus obtain the article 1.

According to a particularly advantageous embodiment, this process is particularly suitable for the production of discs for disc brakes.

It follows that, as illustrated in the accompanying drawings, the first component 2 includes or consists of a braking band 22 for a disc brake, and/or the second component 4 includes or consists of a hub or central bell for a disc brake.

The variants illustrated must not, however, be considered as limiting the scope of this invention.

According to an embodiment, the filler material M includes or consists of steel, optionally austenitic, nickel, nickel alloys or mixtures thereof.

Figure 9:
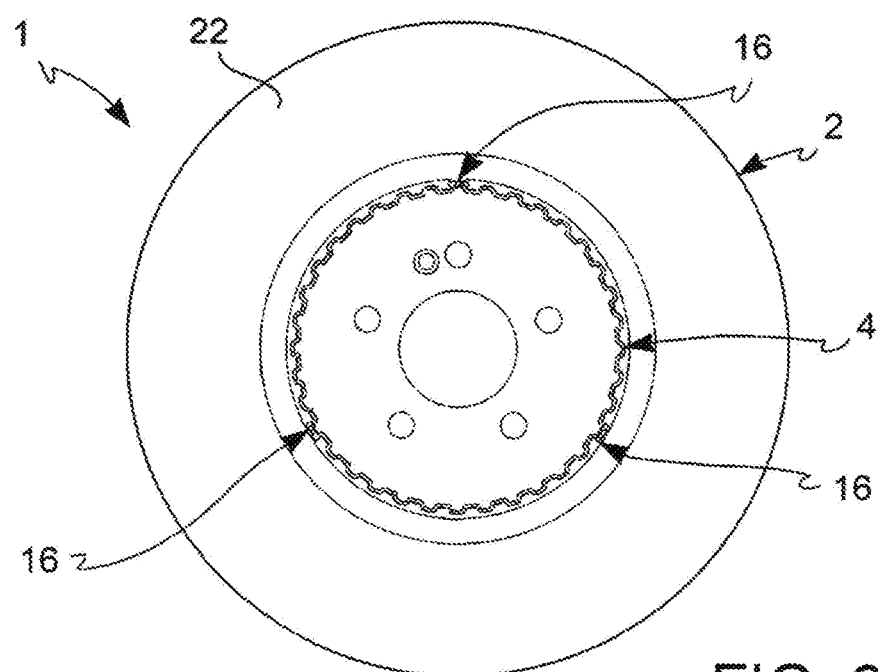

The variant in which the welding zones 16,18 are in a minimum number of three (see for example FIG. 9), located at a distance, and preferably equidistant, is considered advantageous in particular in relation to production costs and structural and strength benefits.

Nevertheless, a further variant could provide for the application of a closed ring wire 6 along the separation zone 8, so as to obtain at least one ring welding area 16,18 and, in this way, the maximum strength. Optionally, such closed ring application could be performed both in correspondence of the separation zone 24 and the outer separation zone 26 discussed below.

Figure 4:
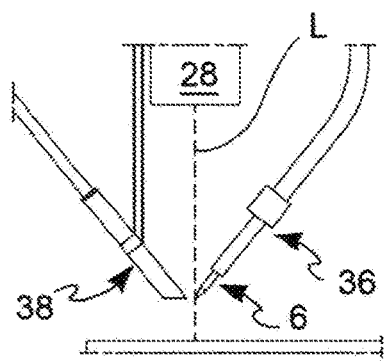
FIGS. 4 and 5 schematise instruments usable in the process of this invention, according to possible variants.
Figure 5:
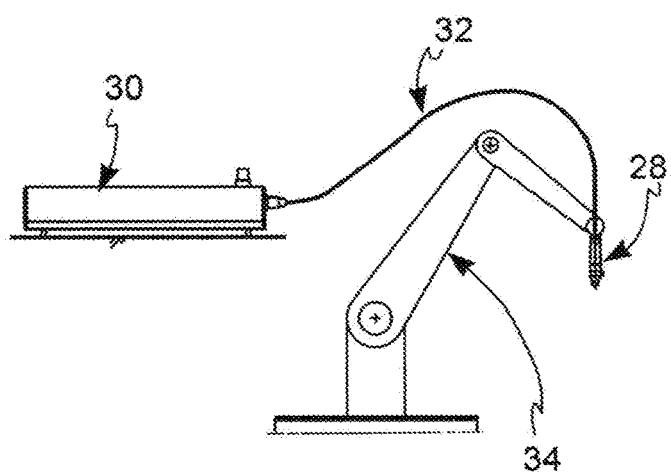

Merely by way of example, FIGS. 4 and 5 show possible instruments for implementing the above process: a set-up module 28 is connected to a source 30 of laser beams through an optical fibre 32. As, for example, shown schematically in these Figures, the set-up module 28 could be adjustable by means of a robotic device 34 or the like.

The source 30 of laser beams L is thus preferably optical fibre.

According to a possible variant, the laser beam L has a substantially circular section, with a diameter of between about 0.5-1.5 mm, optionally between 1.0-1.4 mm, for example about 1.2 millimetres.

In correspondence of the separation zone between the two components to be welded, there converge the laser beam L, the wire 6 of the filler material M fed through a feed device 36 and a dispenser 38 of inert gas, which creates a protective atmosphere in correspondence of molten materials.

For example, the inert atmosphere could be created through a flow of inert gas, for example argon.

Figure 16:
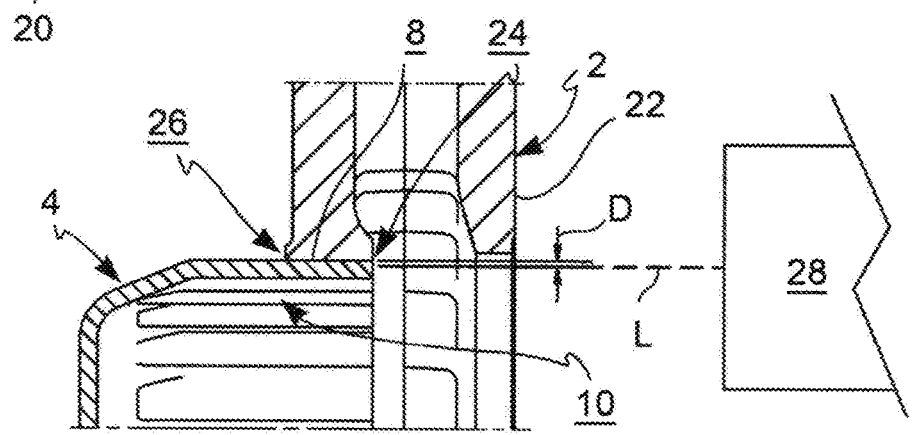

According to a variant (see, for example, FIG. 16), during step iii), the laser beam L is moved or misaligned with respect to the first component 2 by a section D of about 0.1-0.6 millimetres, in order to limit the amount of heat transferred from said beam L to the first component 2 made of cast iron.

In other words, according to a particularly advantageous variant, the laser beam L is oriented or moved towards the second component 4 made of steel so as to transfer heat asymmetrically so that, during step iii), there is a quantitatively greater melting of the steel of the second component 4 and of the filler material M, with respect to the melting of the cast iron of the first component 2.

Figure 15:
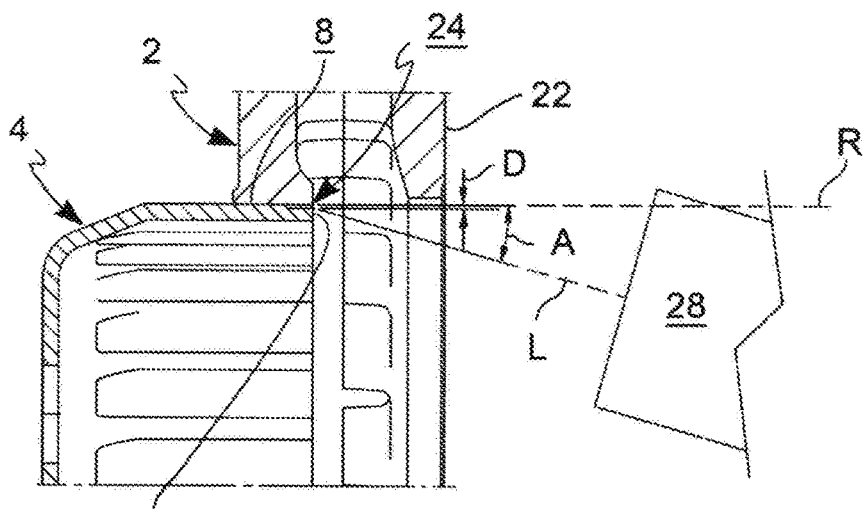
FIGS. 15 and 16 schematise the possible angles of incidence of the laser beam, and the misalignment of this beam with respect to the cast iron component.

According to a further variant (FIG. 15), the laser beam L strikes a surface 20 of the second component and/or of the filler material M with an inclination angle A in the range of 0° to 15° with respect to an axis R substantially orthogonal to said surface 20.

Optionally, the laser beam L could strike a surface 20 of the first component 2 with an inclination angle A in the range of 0° to 15° with respect to an axis R substantially orthogonal to said surface.

Preferably, even in the presence of an inclination angle A, these variants could nevertheless provide for the displacement or misalignment D as discussed previously. According to a further embodiment, the range of inclination angles A in the presence of displacement/misalignment D could be greater than what was discussed earlier, this angle in particular being able to be between 0° to 45° or between 0° to 30°.

For example, the surface 20 could be delimited at least in part by a surface substantially parallel to a band 22 of the first component 2.

As regards the maximum depth of the welding zone 16,18 in the second component 4, that depth could be equal to or less than 25% of the average development or thickness of such component in the incision zone.

According to an advantageous variant, following step i), the first 2 and the second 4 component are rotatably supported around a rotation axis P (preferably in a motorised manner), so that the laser beam L strikes the at least one wire 6 of filler material M along a curved or circle-arc trajectory.

Figure 6:
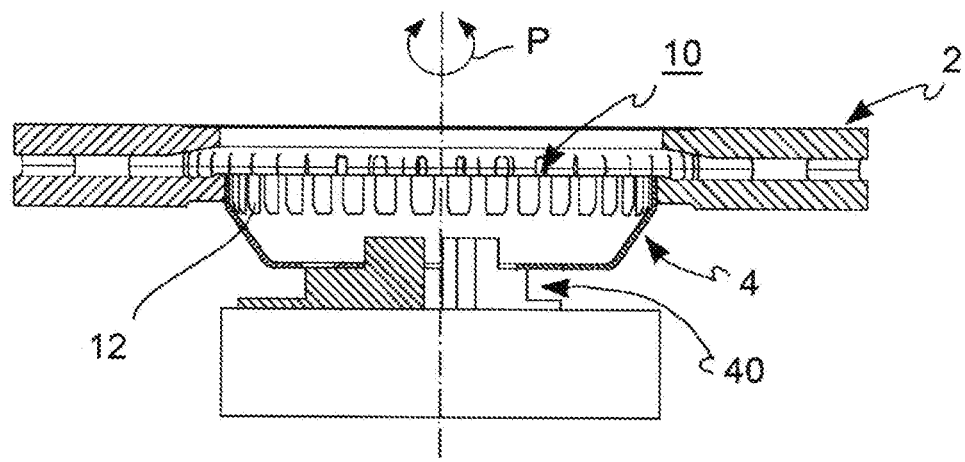
FIG. 6 shows a rotating support system of the components to be welded, according to a possible variant.
Figure 7:
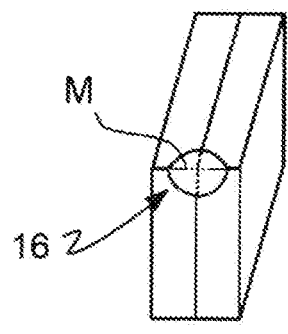
FIGS. 7 and 8 show, respectively, schematisations of possible placements of the welding points, in particular relating to the welding point more to the left in FIG. 14 and the single welding point in FIG. 13.
Figure 8:
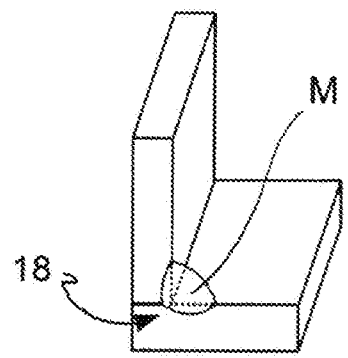

In this regard reference is made for example to the variant of FIG. 6, wherein the components 2,4 are mechanically coupled with each other, and are rotatably supported by a rotating support member 40, for which the optional motorisation has been omitted for greater clarity.

According to an advantageous implementation of the invention, at least during step iii), at least part of the separation zones 8 is facing or oriented vertically upwards, so that the molten steel and filler material M can penetrate by gravity in the separation zones 8.

According to an advantageous variant, step i) comprises a step of compenetrating the first 2 and the second 4 component to create an inner separation zone 24 and an outer separation zone 26, one or both of which are subjected at least to step ii).

In other words, the partial compenetration of the components 2,4 realises an inner separation zone 24 and an outer separation zone 26, which communicate through the thickness of one or both of the above components.

Preferably, following step iv), the inner separation zone 24 comprises one or more butt welding zones 16.

Still more preferably, following step iv), the outer separation zone 26 comprises one or more fillet weld or corner bead 18 zones.

Advantageously, the first 2 or the second component delimits an inner compartment 10 within which the other component (second 4 or first) is received at least in part.

According to this variant, an outer edge 12 of the component is shaped in a complementary manner to an inner edge 14 of the receiving component.

Making reference, for example, to FIG. 1, these edges 12,14 are at least partially jagged or wavy.

Figure 17:
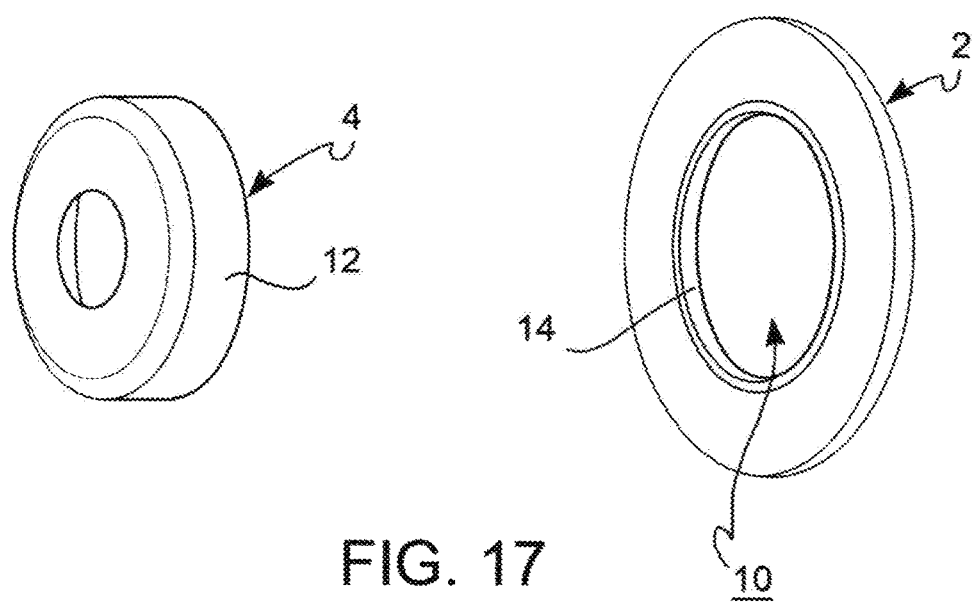
FIGS. 17 and 18 are, respectively, a perspective view in separate parts of a first and of a second component according to a different embodiment, wherein the coupling takes place by force, in particular in the absence of teeth, and a perspective view in section through these coupled components.
Figure 18:
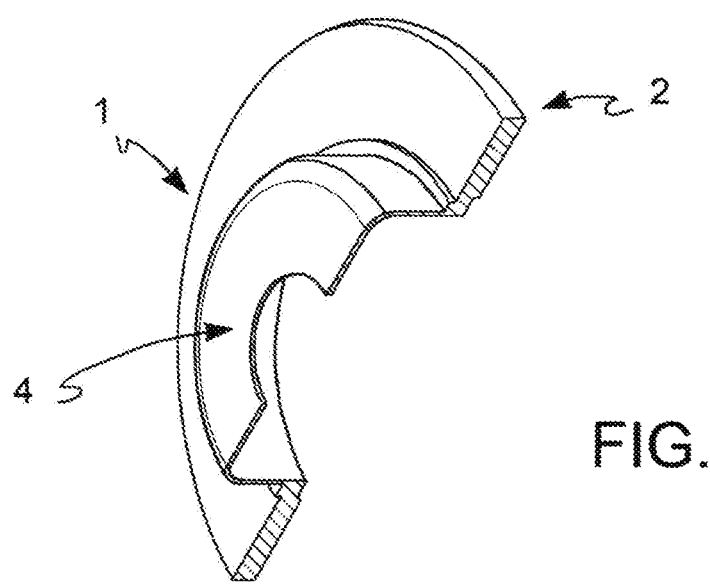
Figure 19:
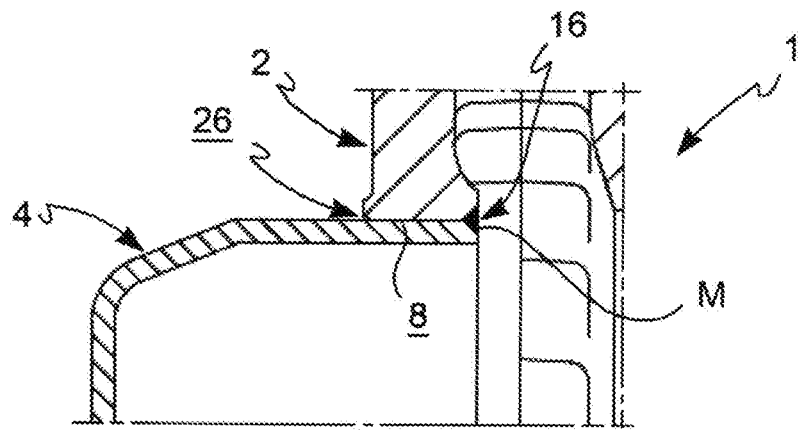
FIGS. 19 and 20 are views corresponding to the views of FIGS. 13 and 14, but in relation to the components of FIG. 17.
Figure 20:
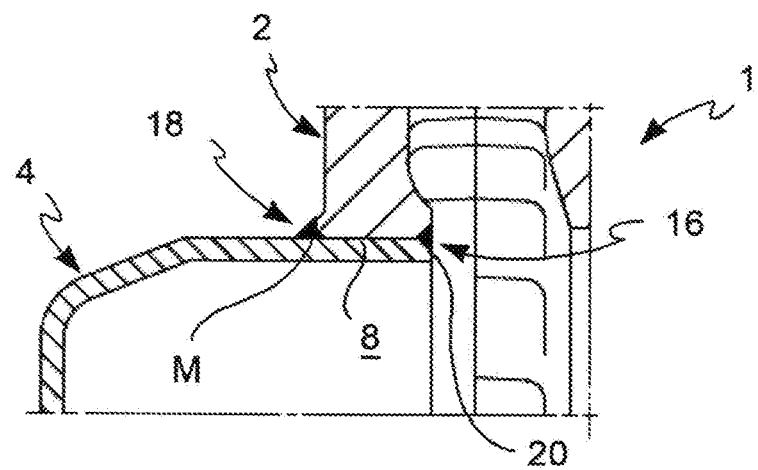

In reference to FIG. 17, the aforesaid edges 12,14 could be substantially smooth (or without teeth), but nevertheless can be coupled by shape and/or force.

According to a particularly preferred embodiment, step iii) comprises a step of precipitating graphite at least from the carbon of the steel of the second component 4, and optionally from the cast iron of the first component 2. It should be clarified that, for equal amounts of carbon moles, the graphite volume is greater than the volume of carbon in steel due to which, through the increase of volume consequent to the precipitation, the graphite limits or at least partly compensates for the thermal shrinkage in the welding zones 16,18 during step iv).

It follows that, according to this variant, lower internal stresses are generated by virtue of this mechanism of the increase in volume of the graphite.

The above objectives are also achieved by means of a composite article, for example for a disc-brake disc, as described below.

Figure 2:
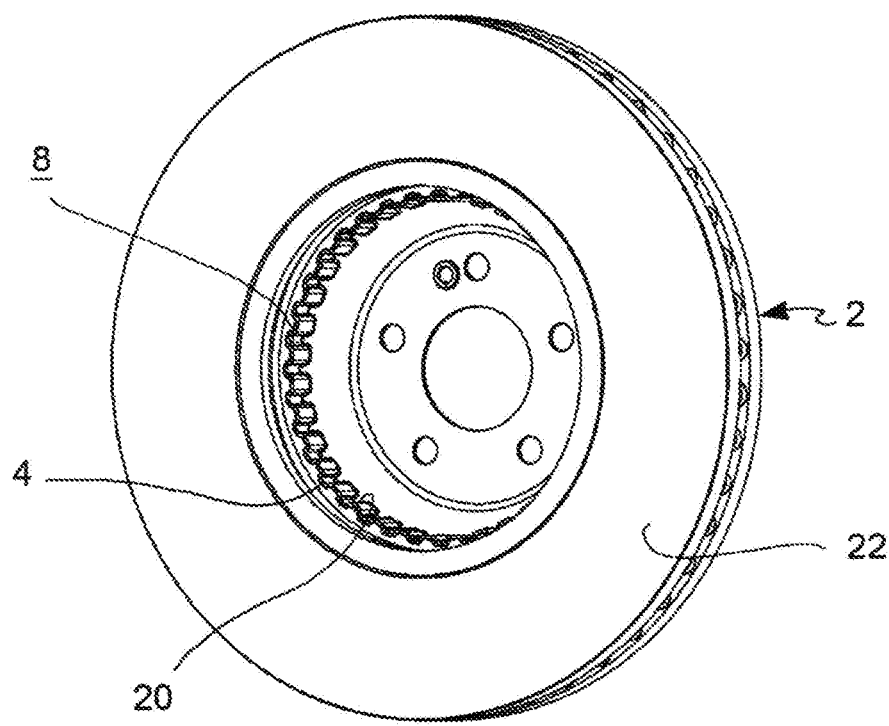
FIG. 2 is a perspective view of the components at the end of step i) of the process.
Figure 3:
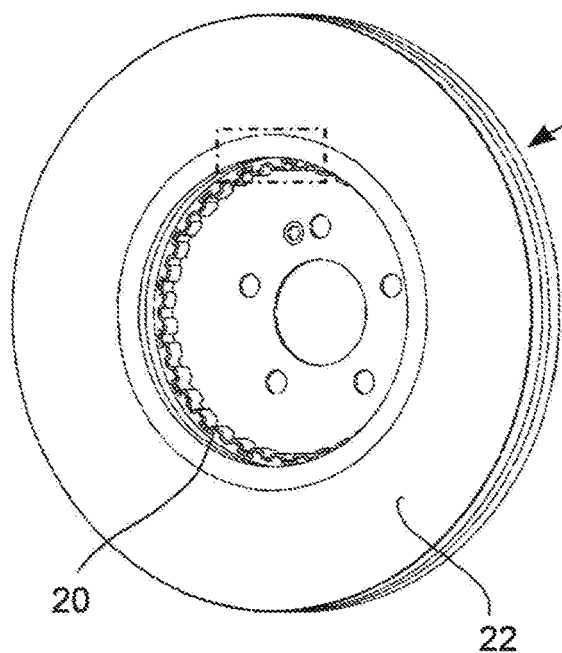
FIGS. 3 and 3A are perspective views of the components of FIG. 2 following step ii), where FIG. 3A corresponds to an enlargement of the highlighted area in FIG. 3.
Figure 3A:
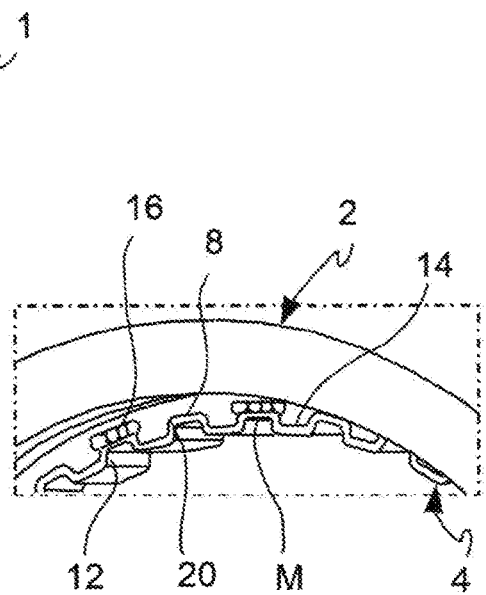

According to possible embodiments, such a disc-brake disc could be of the ventilated type, as for example schematised in FIG. 2, or non-ventilated type.

Since this article is preferably obtained through the process described previously, even if not explicitly stated, preferred or accessory variants of such article could comprise any characteristic deducible even only implicitly, from the point of view of the production steps, from the foregoing description.

This composite article 1 is at least partially made of metal and comprises:
 a first component 2 at least partially made of cast iron and a second component 4 at least partially made of steel coupled with interference;

one or more wires 6 of filler material M arranged at one or more separation zones 8 between such first 2 and second 4 component;

wherein at least part of the separation zone 8 is occupied at least by the steel of the second component 4 and by the filler material M solidified (and optionally also by a fraction—advantageously small—of cast iron of the first component 2 solidified) in welding zones 16,18 to join said first 2 and second 4 component.

According to a variant, the welding zones 16,18 have a linear length in the range of 2-17 millimetres.

According to a further variant, the first 2 and the second 4 component are force and/or shape coupled.

According to a still further variant, the welding zones 16,18 are in a minimum number of three and are optionally in a maximum number of seventy-two. Optionally, there could be provided a single closed ring welding zone 16,18, or a pair of opposed welding zones of this type.

For example, bottom surfaces of at least one welding zone 16,18 could have a V-shaped section, preferably asymmetric by virtue of the previously discussed misalignment/displacement.

Innovatively, the composite article and process of this invention allow brilliantly solving the drawbacks of the prior art.

More precisely, the careful selection of the direction of the laser beam and a wire filler material allow not making the weld brittle since the micro-constituents deleterious for mechanical strength are not formed during the process, or are formed to a lesser extent compared to autogenous welding.

Advantageously, the process and the composite article of this invention allow a reduction in weight compared to traditional mechanical fixing systems.

Advantageously, the process and composite article of this invention allow achieving considerable economies of manufacture, by virtue of the fact that specific processing does not require supplementary or additional equipment respect to those normally provided.

Advantageously, the process and composite article of this invention substantially completely use materials destined to the union of the components, with no waste.

Advantageously, the process and composite article of this invention allow containing the realisation the times of the product to be formed.

Indeed, the above procedure is almost completely automatable in a production line.

Advantageously, the use of a filler material limits the occurrence of defects in the union zones, reduces the possibility of embrittled parts and gives the junction improved corrosion resistance and better mechanical properties.

Advantageously, some variants allow a marked reduction of cost by virtue of the lesser constructive and manufacturing complexity of the second component.

Advantageously, all tests performed on an article comprising only three welding zones, although of reduced extension, have given a result corresponding to at least a product according to the known technique.

More precisely, for a disc for a brake disc, it allowed establishing that there was no critical deformation of the brake disc after the welding process, and the presence of defects was excluded in a transverse cross-section of the disc.

Also the analysis of the micro-structure and mechanical tests of mechanical strength, fatigue behaviour, micro-hardness and corrosion in a salt fog chamber provided conforming results.

To the embodiments of the aforesaid process and composite article, one skilled in the art, in order to meet specific needs, may make variants or substitutions of elements with others functionally equivalent.

Even these variants are contained within the scope of protection, as defined by the following claims.

Moreover, each of the variants described as belonging to a possible embodiment can be realised independently of the other variants described.

The invention claimed is:

1. A process for producing a composite article at least partially made of metal, such as a disc for disc brake, comprising the following steps:
   i) coupling with force interference a first component at least partially made of cast iron and a second component at least partially made of steel;
   ii) arranging one or more wires of filler material at one or more separation zones between said first and second component;
   iii) in an inert atmosphere, directing a laser beam mostly or exclusively on the steel of the second component and on the filler material for occupying at least part of the separation zone at least with molten steel and filler material; and
   iv) solidifying by cooling at least the molten steel and filler material in at least three welding zones to join said first and second component, wherein said at least three welding zones are located at a distance from each other, and thus obtaining said article,
   wherein, during step iii), the laser beam is moved or misaligned with respect to the first component by a section 0.1-0.6 mm, in order to limit the amount of heat transferred from said beam to the first component.

2. The process according to claim 1, wherein the laser beam is oriented or moved towards the second component of steel so as to transfer heat asymmetrically so that, during step iii), a quantitatively greater melting of the steel of the second component and of the filler material, than the melting of the cast iron of the first component occurs.

3. The process according to claim 1, wherein the laser beam strikes a surface of the second component or of the filler material with an inclination angle in the range between 0°-15° with respect to an axis orthogonal to said surface, the latter being a surface parallel to a band of the first component.

4. The process according to claim 1, wherein the maximum depth of the welding zone in the second component is equal to or smaller than 25% of the average development of said component in the incision zone.

5. The process according to claim 1, wherein, following step i), the first and the second component are rotatably supported in a motorised manner so that the laser beam incises the at least one wire of filler material along a curved or circle-arc trajectory.

6. The process according to claim 1, wherein, at least during step iii), at least part of the separation zones is facing or oriented vertically upwards, so that the molten steel and filler material penetrate by gravity the separation zones.

7. The process according to claim 1, wherein step i) comprises a step of compenetrating the first and the second component to create an inner separation zone and an outer separation zone, one or both of which are subjected at least to step ii).

8. The process according to claim 7, wherein, following step iv), the separation zone comprises one or more butt welding zones.

9. The process according to claim 7, wherein, following step iv), the outer separation zone comprises one or more fillet weld or corner bead zones.

10. The process according to claim 7, wherein the first or the second component defines an inner compartment within which the other component, either second or first, is at least partly housed and wherein an outer edge of the housed component is shaped complementary to an inner edge of the accommodating component.

11. The process according to claim 10, wherein said edges are at least partially jagged or wavy.

12. The process according to claim 1, wherein the filler material includes or consists of austenitic steel, nickel, nickel alloys or mixtures thereof.

13. The process according to claim 1, wherein step iii) comprises a step of precipitating graphite at least from the carbon of said steel and optionally from the cast iron of the first component wherein, for equal amounts of carbon moles, the graphite volume is greater than the volume of carbon in steel and wherein, through the increase of volume in the precipitation, said graphite limits or at least partly compensates the thermal shrinkage in the welding areas during step iv).

14. The process according to claim 1, wherein the first component includes or consists of a braking band for a disc brake, and wherein the second component includes or consists of a central bell or hub for a disc brake.

* * * * *